US012026990B2

(12) United States Patent
Sumcad et al.

(10) Patent No.: US 12,026,990 B2
(45) Date of Patent: Jul. 2, 2024

(54) SYSTEM AND METHOD FOR MANAGING FLEET VEHICLES THROUGH SELF-DIAGNOSIS AND REDISTRIBUTION OF ELECTRONIC COMPONENTS

(71) Applicant: GM GLOBAL TECHNOLOGY OPERATIONS LLC, Detroit, MI (US)

(72) Inventors: Anthony J. Sumcad, Rochester Hills, MI (US); Russell A. Patenaude, Macomb Township, MI (US); Christopher L. Oesterling, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 362 days.

(21) Appl. No.: 17/582,295

(22) Filed: Jan. 24, 2022

(65) Prior Publication Data

US 2023/0237854 A1 Jul. 27, 2023

(51) Int. Cl.

*G07C 5/00* (2006.01)
*G07C 5/08* (2006.01)
*G08G 1/00* (2006.01)

(52) U.S. Cl.

CPC ........... *G07C 5/008* (2013.01); *G07C 5/0816* (2013.01); *G07C 5/0841* (2013.01); *G08G 1/20* (2013.01)

(58) Field of Classification Search

CPC .... G07C 5/008; G07C 5/0816; G07C 5/0841; G08G 1/20; G06Q 10/063114; H04L 67/12; H04W 4/38; H04W 4/40; H04W 4/46

See application file for complete search history.

(56) References Cited

U.S. PATENT DOCUMENTS

| | | | | |
|---|---|---|---|---|
| 11,254,274 | B1 * | 2/2022 | Allbee | B62D 21/11 |
| 2015/0081161 | A1 * | 3/2015 | Chapman | G06Q 10/00 701/31.5 |
| 2017/0236127 | A1 * | 8/2017 | Tahir | G06Q 30/014 705/7.32 |
| 2017/0372274 | A1 * | 12/2017 | Mikelonis | G05B 15/02 |
| 2018/0210975 | A1 * | 7/2018 | Liu | G06N 20/00 |
| 2019/0025818 | A1 * | 1/2019 | Mattingly | H04L 67/1051 |
| 2019/0050458 | A1 * | 2/2019 | Merg | G06F 16/2471 |
| 2019/0384292 | A1 * | 12/2019 | Aragon | B60W 50/00 |
| 2021/0116256 | A1 * | 4/2021 | Konrardy | G05B 23/0245 |

* cited by examiner

*Primary Examiner* — James J Lee
*Assistant Examiner* — Alexander George Matta
(74) *Attorney, Agent, or Firm* — Quinn IP Law

(57) ABSTRACT

A system for managing a set of fleet vehicles includes a central command unit having a processor and tangible, non-transitory memory on which instructions are recorded. The fleet vehicles have one or more respective electronic components and respective vehicle controllers adapted to perform self-diagnosis of their respective electronic components. The central command unit is adapted to receive notification of the self-diagnosis and classify the respective electronic components as working ones and non-working ones. The central command unit is adapted to perform component matching, including polling inventory across the fleet vehicles. Working ones of the respective electronic components are selectively redistributed for reuse across the fleet vehicles. In some embodiments, at least one of the fleet vehicles is designated as a master vehicle and the central command unit is stored in the master vehicle. In other embodiments, the central command unit is stored in a cloud computing service.

15 Claims, 3 Drawing Sheets

SYSTEM AND METHOD FOR MANAGING FLEET VEHICLES THROUGH SELF-DIAGNOSIS AND REDISTRIBUTION OF ELECTRONIC COMPONENTS

INTRODUCTION

The present disclosure relates generally to a system and method for managing a set of fleet vehicles having respective electronic components. Fleet vehicles are groups of vehicles used and/or owned by an entity such as an organization, a business or a public agency. Fleet vehicles have become increasingly common. Examples of fleet vehicles include those operated by car rental companies, taxis or public buses, and police departments. Additionally, many online retailers may purchase or lease fleet vehicles to deliver products or packages to customers, or to enable sales representatives to travel to clients.

SUMMARY

Disclosed herein is a system for managing a set of fleet vehicles. The system includes a central command unit having a processor and tangible, non-transitory memory on which instructions are recorded. The fleet vehicles have one or more respective electronic components and respective vehicle controllers adapted to perform self-diagnosis of their respective electronic components. The central command unit is adapted to receive notification of the self-diagnosis and classify the respective electronic components as working ones and non-working ones. The central command unit is adapted to perform component matching, including polling inventory across the fleet vehicles. Working ones of the respective electronic components are selectively redistributed for reuse across the fleet vehicles.

Managing the set of fleet vehicles may include modification and movement of the respective electronic components. In some embodiments, at least one of the fleet vehicles is designated as a master vehicle and the central command unit is stored in the master vehicle. In some embodiments, the central command unit may be stored in a cloud computing service. The fleet vehicles may include a respective telematics control unit for establishing two-way communications with the central command unit. In some embodiments, the fleet vehicles may include a respective mobile application for communicating with the central command unit, with the mobile application being embedded in a smart device. The respective electronic components may include at least one of the following: a powertrain control module, a body control module and an assisted driving module.

The central command unit may be adapted to perform pattern analysis pertaining to damage in the one or more respective electronic components and set up remediation measures based in part on the pattern analysis. The pattern analysis may include comparing the fleet vehicles bearing a load and the fleet vehicles not bearing the load. The pattern analysis may include identifying at least one lower-risk zone and at least one higher-risk zone within at least one of the fleet vehicles based in part on the pattern analysis.

The remediation measures may include relocating the respective electronic components from the at least one higher-risk zone to the at least one lower-risk zone. The remediation measures may include sending a notification to a manufacturer and/or a supplier of the fleet vehicles. The remediation measures may include adding a protective layer to the one or more respective electronic components located in the at least one higher-risk zone. In some embodiments, the fleet vehicles include armed service vehicles and/or rental vehicles.

Disclosed herein is a method for managing a set of fleet vehicles. The method includes setting up a central command unit with a processor and tangible, non-transitory memory on which instructions are recorded, with the fleet vehicles each having one or more respective electronic components and respective vehicle controllers. The method includes self-diagnosis of the respective electronic components, performed via the respective vehicle controllers. Notification of the self-diagnosis is sent to the central command unit. The method includes classifying the one or more respective electronic components as working ones and non-working ones, via the central command unit. Component matching is performed, via the central command unit, including polling inventory across the fleet vehicles. The method includes selectively redistributing the working ones of the one or more respective electronic components for reuse across the fleet vehicles, via the central command unit.

The above features and advantages and other features and advantages of the present disclosure are readily apparent from the following detailed description of the best modes for carrying out the disclosure when taken in connection with the accompanying drawings.

Figure 1:
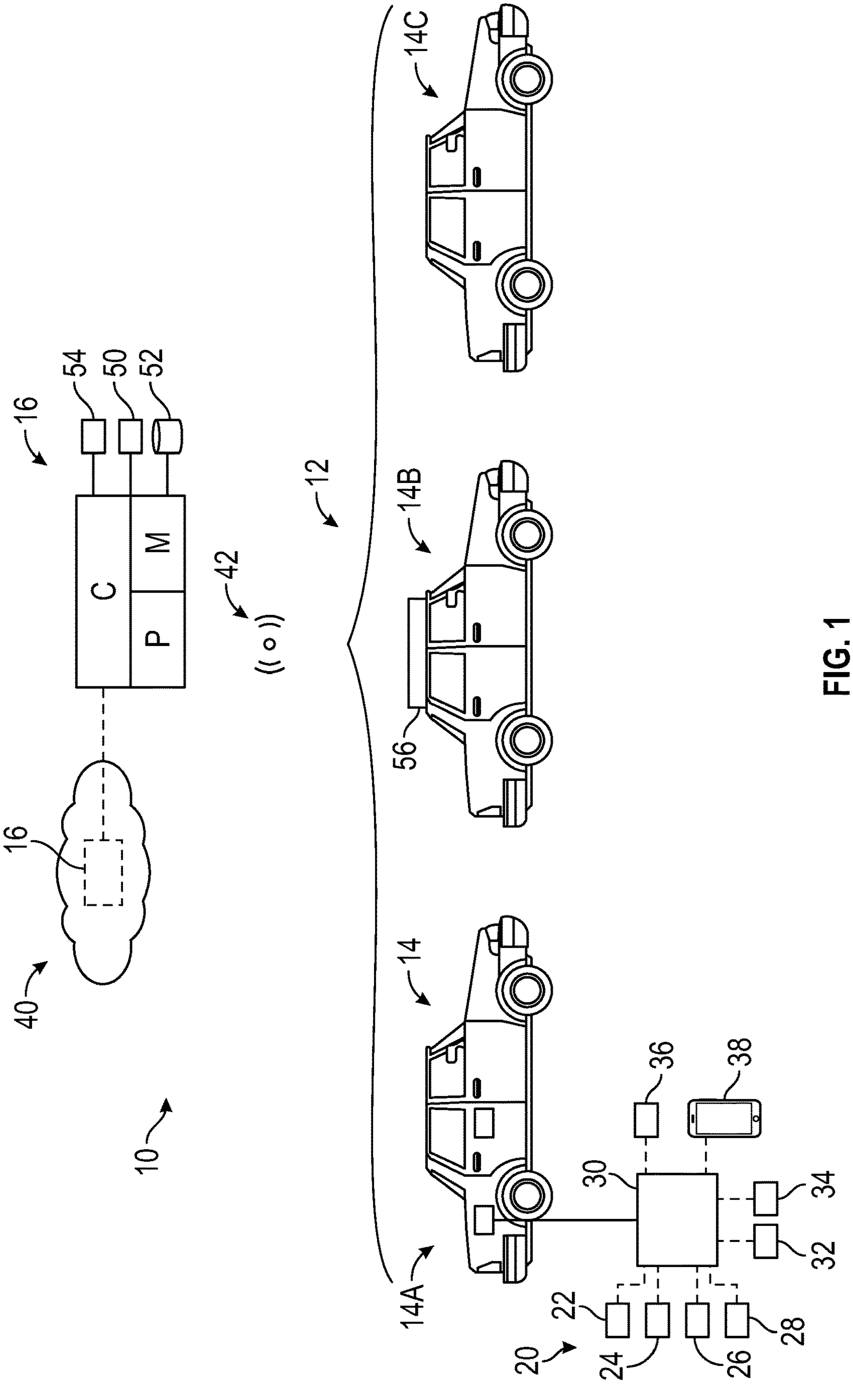
FIG. 1 is a schematic fragmentary diagram of a system for managing a set of fleet vehicles.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a system 10 for managing a set 12 of fleet vehicles 14, e.g., first vehicle 14A, second vehicle 14B and third vehicle 14C. The fleet vehicles 14 may include vehicles belonging to the armed services and/or rental service vehicles. The fleet vehicles 14 may include, but are not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), train or another moving platform. The fleet vehicles 14 may be electric vehicles, which may be purely electric or hybrid/partially electric. It is to be understood that the fleet vehicles 14 may take many different forms and have additional components.

Referring to FIG. 1, the system 10 includes a central command unit 16 having an integrated controller C with at least one processor P and at least one memory M (or non-transitory, tangible computer readable storage medium) on which instructions are recorded. The memory M can store controller-executable instruction sets, and the processor P can execute the controller-executable instruction sets stored in the memory M. The system 10 provides a technical advantage of eliminating lag time related to replacement of damaged components.

Referring to FIG. 1, the fleet vehicles 14 have one or more respective electronic components 20 ("one or more" omitted henceforth) adapted to perform a variety of functions. Managing the set 12 of fleet vehicles 14 may include modification and movement of the respective electronic components. The respective electronic components 20 may include, but are limited to, a powertrain control module 22, a body control module 24, an assisted driving module 26 and a battery control module 28. It is understood that the respective electronic components 20 may include other types of components. Referring to FIG. 1, the fleet vehicles 14 each include respective vehicle controllers 30 adapted to perform self-diagnosis of their respective electronic components 20. For example, the self-diagnosis may be performed by an on-board diagnostic unit 32 that collects information from a network of sensors 34 inside the fleet vehicles 14.

As described below, the central command unit 16 is adapted to receive notification of the self-diagnosis and perform component matching, including polling inventory across the fleet vehicles 14. In other words, the central command unit 16 is adapted to analyze the salvageability of working ones of the respective electronic components 20 from one of the fleet vehicles 14 for reuse by another one of the fleet vehicles 14. Additionally, as described below, the system 10 enables a pattern recognition of damage to the respective electronic components 20 for remediation both locally within the fleet vehicles 14 and manufacturing plant prevention.

Referring to FIG. 1, the fleet vehicles 14 may include a respective telematics control unit 36 for establishing two-way communications with the central command unit 16, including recording and transmitting vehicle data. For example, the respective telematics control unit 36 may collect telemetry data from the fleet vehicles 14, such as location, speed, engine data, maintenance requirements and servicing, by interfacing with various internal sub-systems. The respective telematics control unit 36 may enable vehicle-to-vehicle (V2V) communication and/or a vehicle-to-everything (V2X) communication.

Referring to FIG. 1, the fleet vehicles 14 may include a respective mobile application 38 for communicating with the central command unit 16. The mobile application 38 may be embedded in a smart device (e.g., smart phone) belonging to a user of the fleet vehicles 14, which may be plugged in or otherwise linked to the fleet vehicles 14. The respective mobile application 38 may be physically connected (e.g., wired) to the fleet vehicles 14 as part of the vehicle infotainment unit. The circuitry and components of a mobile application ("apps") available to those skilled in the art may be employed.

Referring to FIG. 1, the central command unit 16 may be stored in an "off-board" or remotely located cloud computing service 40. The cloud computing service 40 may include one or more remote servers hosted on the Internet to store, manage, and process data. The cloud computing service 40 may be at least partially managed by personnel at various locations. The cloud computing service 40 may be a private or public source of information maintained by an organization, such as for example, a research institute, a company, a university and/or a hospital.

Figure 2:
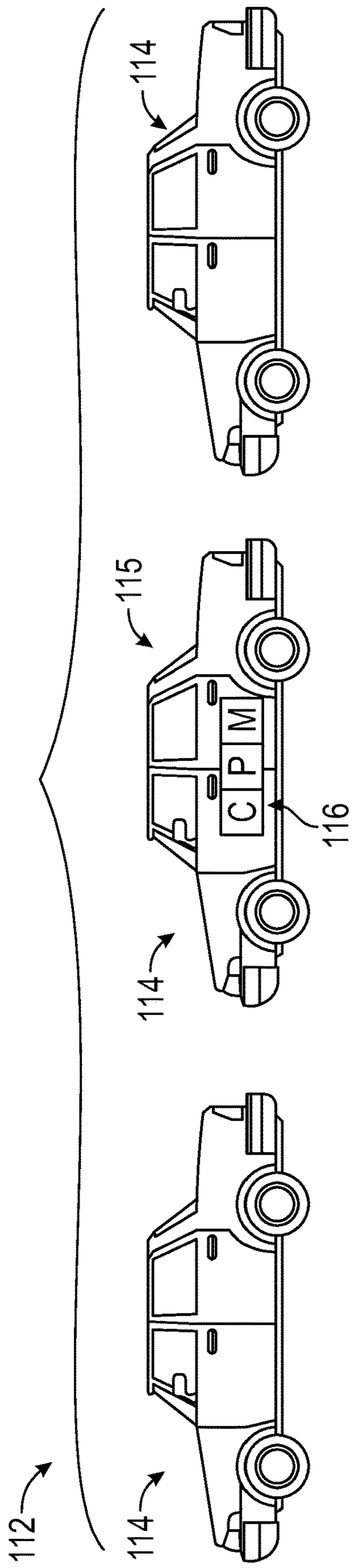
FIG. 2 is a schematic fragmentary diagram of the system of FIG. 1 in accordance with another embodiment.

Referring to FIG. 2, in another embodiment, one of the fleet vehicles 114 in the set 112 is designated as a master vehicle 115 and houses the central command unit 116. Here, the central command unit 116 may be an integral portion of, or a separate module operatively connected to, other controllers of the master vehicle 115. It is understood that in other aspects, this embodiment remains the same as the embodiment described with respect to FIG. 1.

The system 10 may employ a wireless network 42 for communications between the fleet vehicles 14 and the central command unit 16, shown in FIG. 1. The wireless network 42 may be a short-range network or a long-range network. The wireless network 42 may be a communication BUS, which may be in the form of a serial Controller Area Network (CAN-BUS). The wireless network 42 may be a serial communication bus in the form of a local area network. The local area network may include, but is not limited to, a Controller Area Network (CAN), a Controller Area Network with Flexible Data Rate (CAN-FD), Ethernet, blue tooth, WIFI and other forms of data. The wireless network 42 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or communication protocols available to those skilled in the art may be employed.

Figure 4:
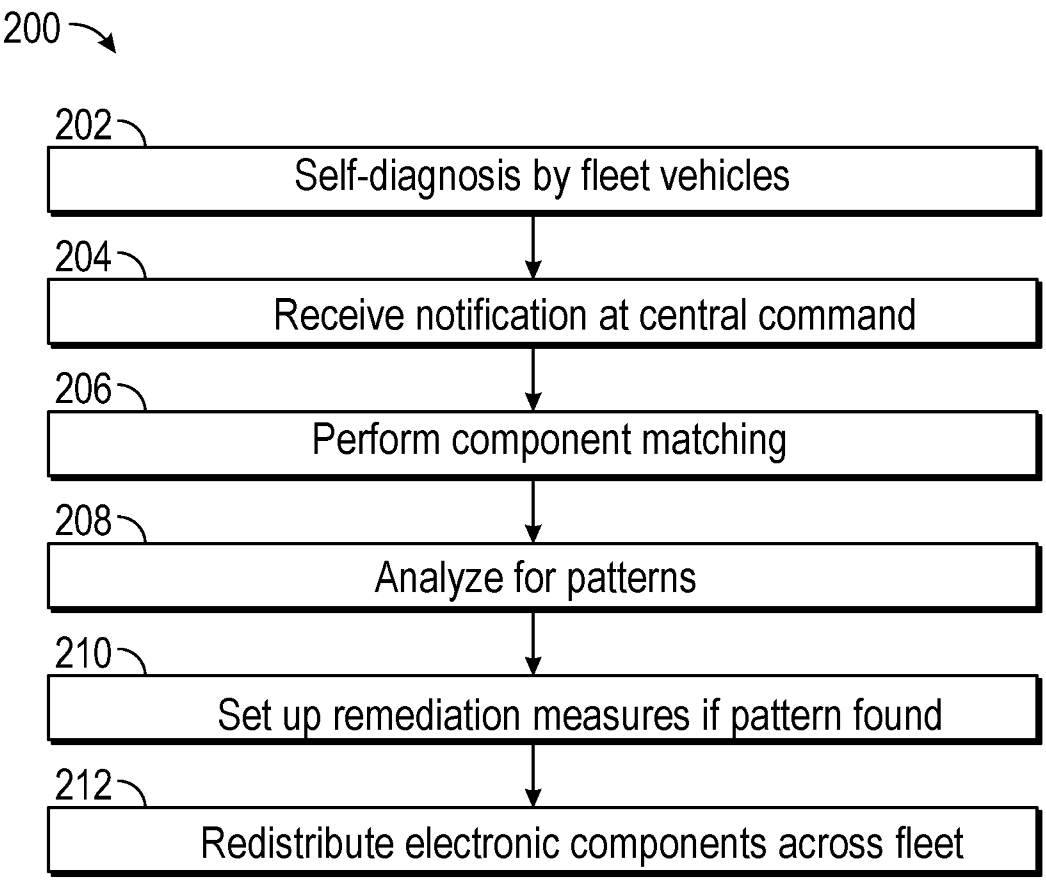
FIG. 4 is a flowchart for a method of operating the management system of FIG. 1.

Referring now to FIG. 4, a flowchart of a method 200 of operating the system 10 (or managing the set 12 of fleet vehicles 14) is shown. Method 200 need not be applied in the specific order recited herein. Furthermore, it is to be understood that some blocks may be eliminated. In some embodiments, method 200 may be embodied as computer-readable code or stored instructions and may be at least partially executable by the central command unit 16.

Per block 202 of FIG. 4, the method 200 includes self-diagnosis by the fleet vehicles 14. The self-diagnosis may be scheduled at regular intervals, at a predetermined time and/or be triggered by a certain event. The self-diagnosis may be performed by the on-board diagnostic unit 32 that collects information from the network of sensors 34 inside the fleet vehicles 14. The sensors 34 may incorporate various types of technology available to those skilled in the art and may include a navigation sensor and an inertial measurement unit.

Proceeding to block 204 of FIG. 4, the central command unit 16 receives notification of the self-diagnosis. In some embodiments, the central command unit 16 receives a notification upon damage to at least one of the fleet vehicles 14 and the self-diagnosis report. The central command unit 16 may execute or have access to a health detection sub-module 50. The health detection sub-module 50 may assess the health of the respective electronic components 20 and determine their salvageability through a binary outcome output, with the respective electronic components 20 being classified as either "working" or "non-working."

Per block 206 of FIG. 4, the central command unit 16 is adapted to perform component matching, including scanning or searching the inventory of fleet vehicles 14 for physical and/or electronic compatibility with those of the respective electronic components 20 that are classified as the working ones (in block 204). Referring to FIG. 1, the inventory may be stored in a database 52 accessible to the central command unit 16.

Advancing to block 208 of FIG. 4, the central command unit 16 is adapted to perform pattern analysis pertaining to damage in the one or more respective electronic components 20, e.g., via the analysis sub-module 54. The pattern analysis may include dividing a fleet vehicle 314 (see FIG. 3) into a plurality of zones 300 based on a gradation or level of damage risk. For example, the plurality of zones 300 includes a first zone 302, second zone 304, third zone 306, fourth zone 308 and fifth zone 310. The central command unit 16 may be adapted to identify at least one lower-risk zone (e.g., second zone 304) and at least one higher-risk zone (e.g., fifth zone 310) in the fleet vehicles 314. The pattern analysis may further include comparing the fleet vehicles (e.g., vehicle 14B) bearing a load 56 (shown in FIG. 1) and non-load bearing ones of the fleet vehicles (e.g., vehicle 14C). For example, the pattern analysis may search for correlation of the damage to distribution of the load 56.

Proceeding to block 210 of FIG. 4, the method 200 includes setting up remediation measures (e.g., relocation and fortification) if a pattern has been recognized. In other words, depending on the pattern analysis, various remediation measures may be taken. First, the remediation measures may include notifying a manufacturer and/or a supplier of the fleet vehicles 14 of the pattern observed, as well as notifying technicians and service centers associated with the fleet vehicles 14.

Figure 3:
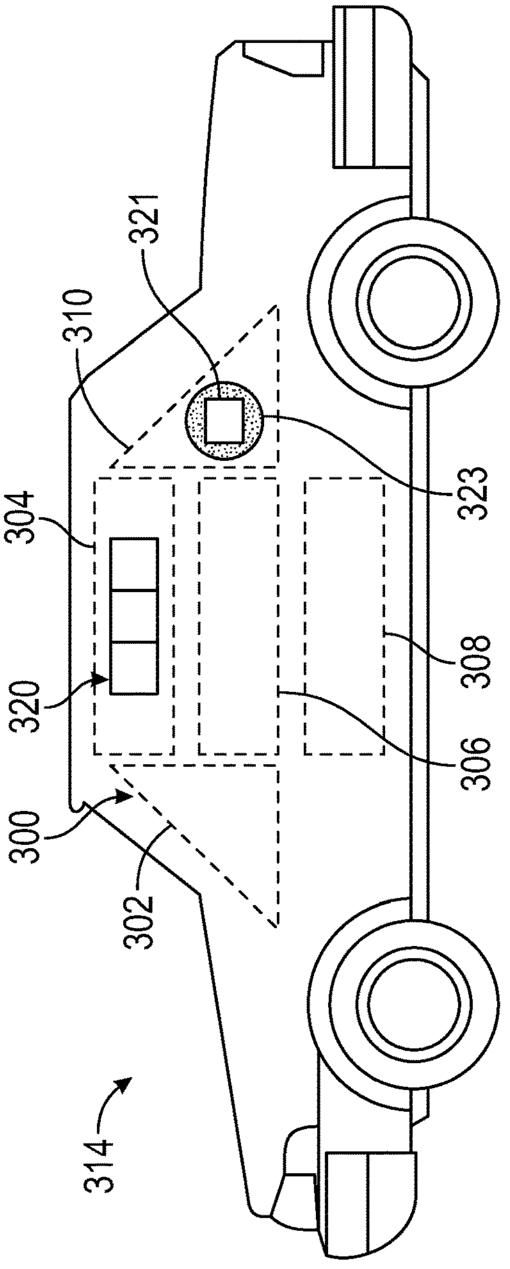
FIG. 3 is a schematic fragmentary diagram of one of the fleet vehicles of FIG. 1.

Second, referring to FIG. 3, the remediation measures may include clustering or relocating the respective electronic components 320 from a higher-risk zone into a lower-risk zone (e.g., from the fifth zone 310 to the second zone 304). Third, remediation measures may include adding a protective layer 323 (see FIG. 3) to the respective electronic components 321 (see FIG. 3) located in the higher-risk zones (e.g., fifth zone 310). The protective layer 323 may incorporate impact-attenuating materials such as shock absorbing polymers, and viscoelastic polymers, e.g., rubber, neoprene and silicone. The protective layer 323 may incorporate radiation shielding material, such as lead.

Per block 212 of FIG. 4, the central command unit 16 is adapted to allocate or redistribute the working ones of the respective electronic components 20 for reuse across the fleet vehicles based on their electronic compatibilities assessed in block 206 and the remediation measures in block 210. In a non-limiting example, a set 12 includes a first vehicle 14A that incurs damage during a mission. Upon receipt of the self-diagnosis for the first vehicle 14A, it is determined that the body control module 24 and the assisted driving module 26 are damaged (classified as non-working), however, the powertrain control module 22 is classified as working. The set 12 includes a second vehicle 14B that is idle, on preventative maintenance and compatible. Here, the working components of the first vehicle 14A may be harvested to reconfigure the second vehicle 14B, which may then be sent out to complete the mission of the first vehicle 14A.

In summary, the system 10 enables optimized continuity of local vehicle services when damage within the set 12 of fleet vehicles 14 occurs. The fleet vehicles 14 are adapted to perform self-diagnosis of their respective electronic components 20, which are selectively redistributed across the fleet vehicles 14.

The central command unit 16 of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a group of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating rechargeable energy storage system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based rechargeable energy storage systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term “about” whether or not “about” actually appears before the numerical value. “About” indicates that the stated numerical value allows some slight imprecision (with some approach to exactness in the value; about or reasonably close to the value; nearly). If the imprecision provided by “about” is not otherwise understood in the art with this ordinary meaning, then “about” as used here indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for managing a set of fleet vehicles, the system comprising:

a central command unit having a processor and tangible, non-transitory memory on which instructions are recorded;

wherein the fleet vehicles each include one or more respective electronic components and respective vehicle controllers adapted to perform self-diagnosis of the one or more respective electronic components;

wherein the central command unit is adapted to receive notification of the self-diagnosis and classify the one or more respective electronic components as working ones and non-working ones;

wherein the central command unit is adapted to perform component matching, including polling inventory across the fleet vehicles;

wherein the central command unit is adapted to perform pattern analysis pertaining to damage in the one or more respective electronic components and set up remediation measures based in part on the pattern analysis;

wherein the pattern analysis includes identifying at least one lower-risk zone and at least one higher-risk zone within at least one of the fleet vehicles, the remediation measures including relocating the one or more respective electronic components from the at least one higher-risk zone to the at least one lower-risk zone; and wherein the central command unit is adapted to selectively redistribute the working ones of the one or more respective electronic components for reuse across the fleet vehicles.

2. The system of claim 1, wherein at least one of the fleet vehicles is designated as a master vehicle and the central command unit is stored in the master vehicle.

3. The system of claim 1, wherein the central command unit is stored in a cloud computing service.

4. The system of claim 1, wherein the fleet vehicles have a respective telematics control unit for establishing two-way communications with the central command unit.

5. The system of claim 1, wherein the fleet vehicles have a respective mobile application for communicating with the central command unit, the respective mobile application being embedded in a smart device.

6. The system of claim 1, wherein the one or more respective electronic components include at least one of a powertrain control module, a body control module and an assisted driving module and wherein managing the set of fleet vehicles includes modification and movement of the one or more respective electronic components.

7. The system of claim 1, wherein the pattern analysis includes comparing the fleet vehicles bearing a load and the fleet vehicles not bearing the load.

8. The system of claim 1, wherein the remediation measures include sending a notification to a manufacturer and/or a supplier of the fleet vehicles.

9. The system of claim 1, wherein the remediation measures include adding a protective layer to the one or more respective electronic components located in the at least one higher-risk zone.

10. The system of claim 1, wherein the fleet vehicles include armed service vehicles and/or rental vehicles.

11. A method for managing a set of fleet vehicles, the method comprising:

setting up a central command unit with a processor and tangible, non-transitory memory on which instructions are recorded, the fleet vehicles each having one or more respective electronic components and respective vehicle controllers;

performing self-diagnosis of the one or more respective electronic components, via the respective vehicle controllers, and sending notification of the self-diagnosis to the central command unit;

classifying the one or more respective electronic components as working ones and non-working ones, via the central command unit;

performing component matching, via the central command unit, including polling inventory across the fleet vehicles;

performing pattern analysis pertaining to damage in the one or more respective electronic components, via the central command unit, including identifying at least one lower-risk zone and at least one higher-risk zone within one of the fleet vehicles;

setting up remediation measures based in part on the pattern analysis, including relocating the one or more respective electronic components from the at least one higher-risk zone to the at least one lower-risk zone; and selectively redistributing the working ones of the one or more respective electronic components for reuse across the fleet vehicles, via the central command unit.

12. The method of claim 11, further comprising:

designating at least one of the fleet vehicles as a master vehicle and storing the central command unit in the master vehicle.

13. The method of claim 11, further comprising:

storing the central command unit in a cloud computing service.

14. The method of claim 11, further comprising:

setting up remediation measures based in part on the pattern analysis, including adding a protective layer to the one or more respective electronic components located in the at least one higher-risk zone.

15. A system for managing a set of fleet vehicles, the system comprising:

a central command unit having a processor and tangible, non-transitory memory on which instructions are recorded;

wherein the fleet vehicles each include one or more respective electronic components and respective vehicle controllers adapted to perform self-diagnosis of the one or more respective electronic components;

wherein the central command unit is adapted to:

receive notification of the self-diagnosis and classify the one or more respective electronic components as working ones and non-working ones;

perform component matching, including polling inventory across the fleet vehicles;

perform pattern analysis pertaining to damage in the one or more respective electronic components, including identifying at least one lower-risk zone and at least one higher-risk zone in one of the fleet vehicles;

set up remediation measures based in part on the pattern analysis, including relocating the one or more respective electronic components to the at least one lower-risk zone and adding a protective layer to the one or more respective electronic components located in the at least one higher-risk zone; and selectively redistribute the working ones of the one or more respective electronic components for reuse across the fleet vehicles.

* * * * *